United States Patent [19]

Quinn

[11] 4,238,150
[45] Dec. 9, 1980

[54] ROTATABLE ELECTRONIC FLASH DEVICE WITH AUTOMATIC LIGHT SENSOR TRACKING

[75] Inventor: Peter T. Quinn, Littleton, Colo.

[73] Assignee: Rollei of America, Inc., Littleton, Colo.

[21] Appl. No.: 998

[22] Filed: Jan. 4, 1979

[51] Int. Cl.³ .................. G03B 15/05; G03B 7/00
[52] U.S. Cl. ................... 354/145; 354/32; 354/59
[58] Field of Search .......... 354/32, 35, 59, 126, 354/145, 149, 189, 33–34; 362/4

[56] References Cited
U.S. PATENT DOCUMENTS

| 3,187,170 | 6/1965 | Kille | 354/145 X |
| 3,291,996 | 12/1966 | Stimson | 354/59 X |
| 3,967,106 | 6/1976 | Chen | 354/32 X |
| 4,067,024 | 1/1978 | Quinn | 354/23 R |

Primary Examiner—Richard A. Wintercorn
Assistant Examiner—Thomas H. Tarcza
Attorney, Agent, or Firm—Allegretti, Newitt, Witcoff & McAndrews

[57] ABSTRACT

An electronic flash device for associated camera attachment, in which the flash device is rotatable about an axis generally perpendicular to the normally horizontal viewing plane of the camera lens. The light sensor of the flash device is automatically positioned by the rotational movement of the flash device, for maintaining the sensor's line of sight, parallel with the camera lens' view direction.

8 Claims, 3 Drawing Figures

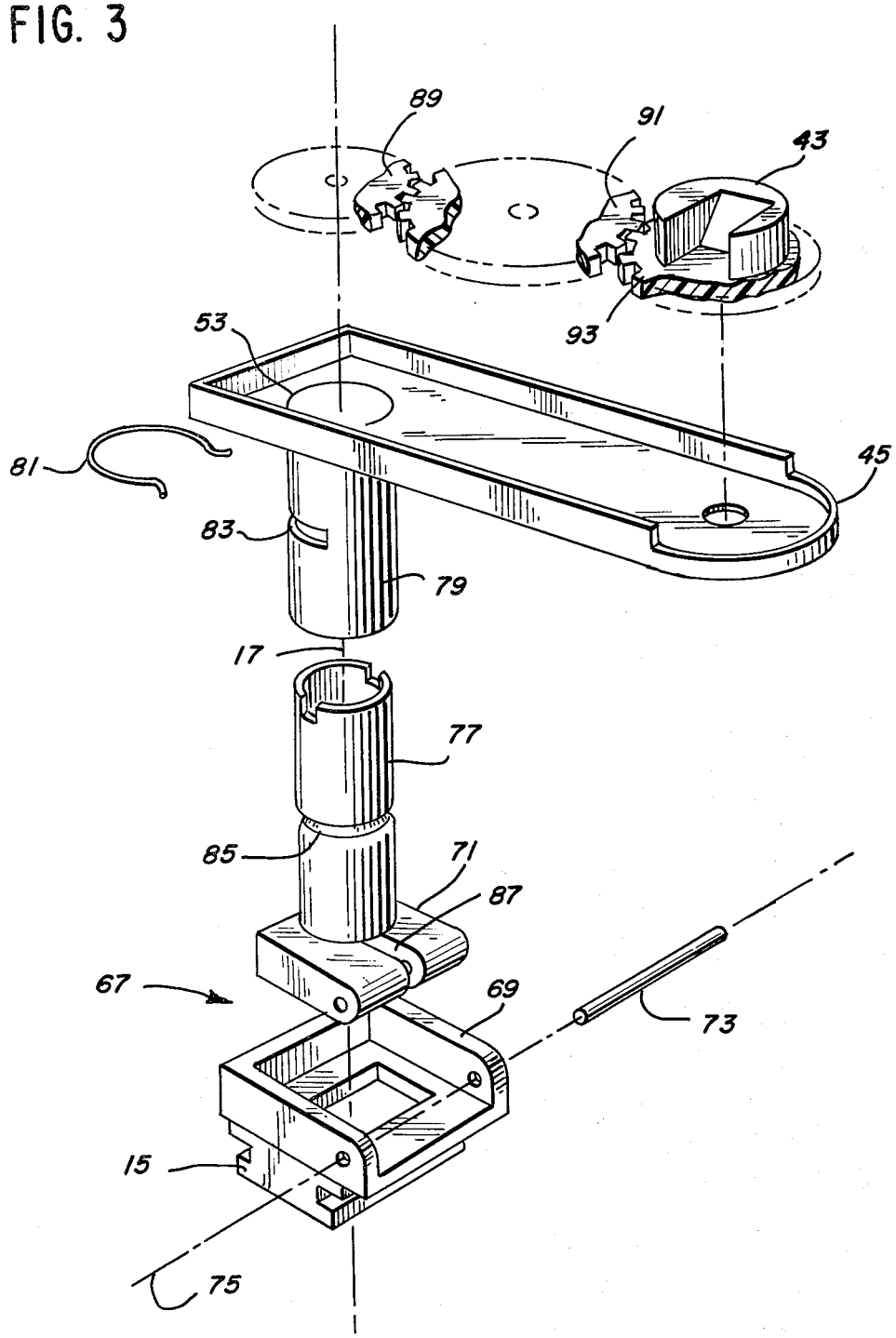

ROTATABLE ELECTRONIC FLASH DEVICE WITH AUTOMATIC LIGHT SENSOR TRACKING

BACKGROUND OF THE INVENTION

The invention relates to photographic flash equipment and, more particularly, to an electronic flash device which maintains the view direction of an associated light sensor relative to the view direction of the camera lens despite changes in the flash direction of the device.

As is well known in the art of photography, there are occasions when it is desirable to illuminate a subject to be photographed with light that is reflected from a nearby surface, as for example, a ceiling or wall adjacent the subject to be photographed, so that in the photograph, the subject will appear to be illuminated in a way characteristic of natural lighting of the sun. Photographers having flash equipment which is carried separately from the camera may accomplish such an indirect flash lighting by bouncing the flash from a nearby surface adjacent the subject.

However, an electronic flash device is not normally carried separately from the camera where the electronic flash device includes a light sensor which is directed toward the scene for sensing reflective light. The light sensor must monitor the light which emanates from the scene in order to calculate via a light measuring circuit the amount of light incidence on the camera film. Measurement by the light sensing circuit of a predetermined amount of light is indicative of the fact that the light sensitive film within the camera has been properly exposed, and that the flash should be terminated.

Thus, it would be highly desirable to provide an electronic flash device which is connectable to a camera and yet permits directional changes in the flash output for effectuating bounce flash photography, and wherein the flash control circuitry is still able to determine when the film is properly exposed from light entering the lens aperture.

It is, therefore, an object of the present invention to provide an apparatus which automatically compensates for the effect on light exposure calculation caused by rotation or other positioning of the flash direction of an electronic flash device.

This and other objects of the invention are accomplished by automatically controlling the view direction of a light transducer responsive to directional changes in the flash of the device, which would otherwise affect light exposure calculation.

BRIEF DESCRIPTION OF THE DRAWINGS

FIG. 3 is a partial, exploded view of another embodiment of a portion of the flash apparatus.

DESCRIPTION OF THE PREFERRED EMBODIMENT

Figure 1:
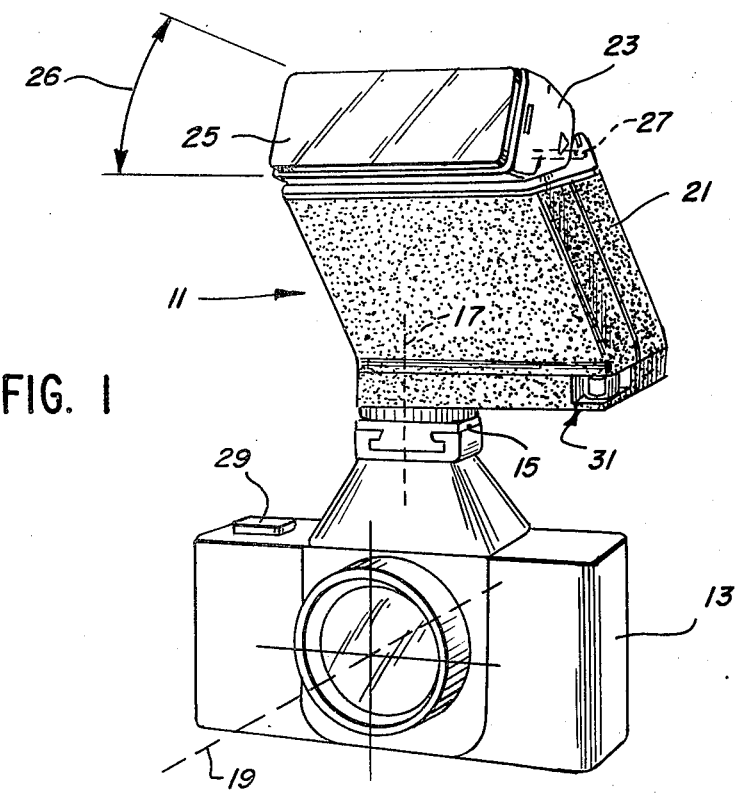
FIG. 1 is a perspective view of an embodiment of the flash apparatus of the present invention.

Referring to FIG. 1, an electronic flash device 11 is shown attached to a camera 13 via a conventional connecting device, a camera shoe 15. Flash device 11 is constructed in a manner as described hereinafter, for permitting its rotation about a relatively vertical axis 17 passing through camera shoe 15.

Flash device 11 is constructed from a main housing 21 for encasing conventional flash control circuitry (not shown), and a flash tube housing 23 for enclosing the back side of a flash tube apparatus 25 for presentation of a flash along a general flash direction. As will be understood, a general flash direction is the direction of aim of the flash in which light rays are directed from the flash source within a defined angular range, illustrated generally by reference numeral 26.

Tube housing 23 is pivotably mounted to main housing 21 for permitting rotation of the flash tube apparatus about an axis 27 disposed in a relatively horizontal direction, for bouncing the flash from a ceiling or surface above the camera while the camera is held in its normal operating position.

The electronic flash device remains secured to the camera, and yet the photographer may position the flash device for directing light remotely from the camera in order to obtain the highly desirable incidence of indirect or displaced lighting.

A conventional camera switch 29 is located on the camera housing and is actuable for operating the camera shutter and for generating an electrical signal to the flash device for firing flash tube apparatus 25, providing light for the illumination of the scene to be photographed. The light reflected back from the scene is monitored by a light sensor 31 which is connected to the flash control circuitry for controlling the automatic termination of the flash responsive to a quantity of light energy reaching sensor 31.

Figure 2:
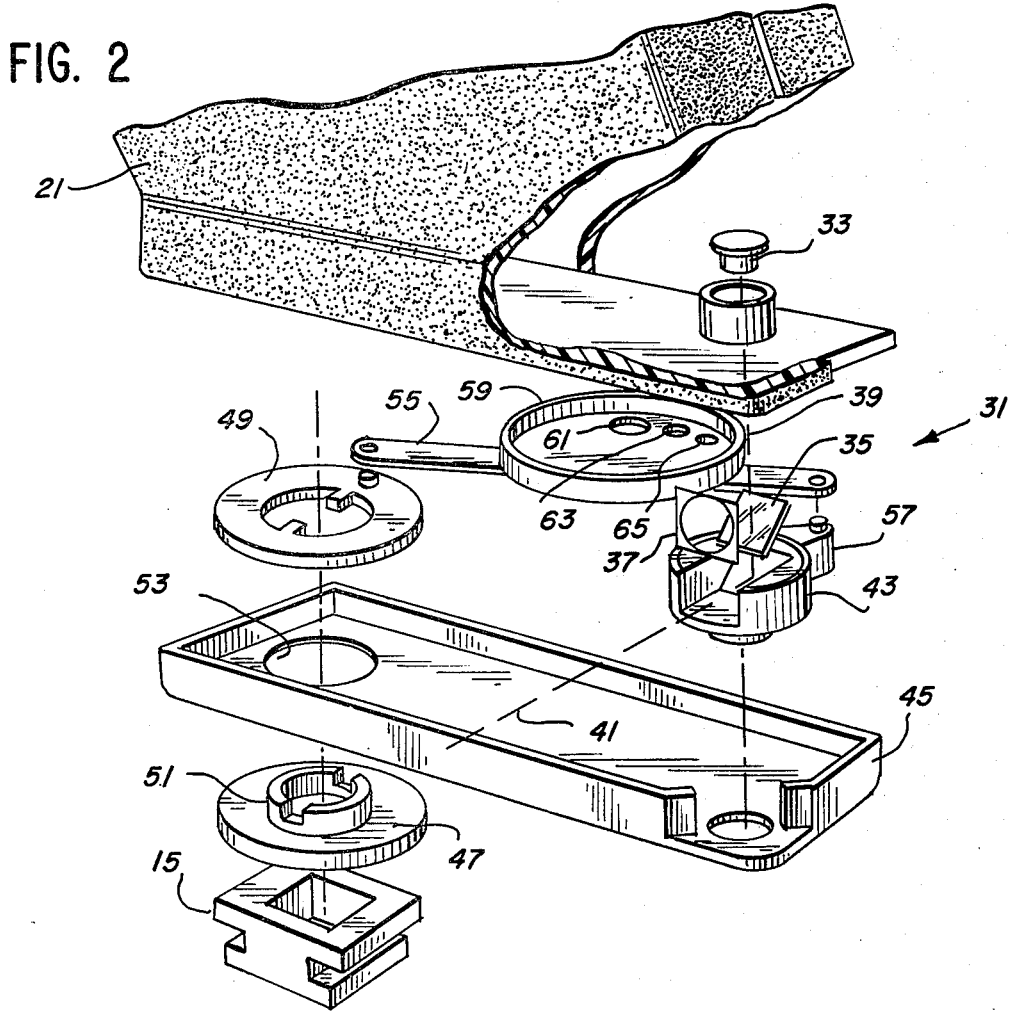
FIG. 2 is an exploded view of a portion of the flash apparatus embodiment of FIG. 1.

Referring to FIG. 2, light sensor 31 is constructed from a photosensing device 33 positioned for sensing along an angulated optical path formed by a mirror or prism 35 and an aperture defining member 37. Photosensing device 33 is positioned for direct sensing along an optical path 39 which is disposed parallel to rotational axis 17 of the flash device. Mirror 35 is positioned for intersecting optical path 39 at a 45° angle for reflecting light onto optical path 39 from a second optical path 41 disposed substantially orthogonal to the first path. Aperture defining member 37 is positioned along path 41 for passing light rays from the photographed scene through an apertured area onto mirror 35.

Mirror 35 and aperture defining member 37 are mounted in a fixed relationship by a holding member 43 which is rotatably mounted to a platform member 45. The rotation of holding member 43 serves to rotate the effective line of sensing of photosensing device 33 by rotation of optical path 41 about an axis of rotation collinear with optical path 39.

Platform member 45 serves as the bottom portion of flash device 11 and is sandwiched between a circular support 47 and a circular crank member 49, for permitting free rotational movement of the flash device about axis 17. Support 47 and crank member 49 are interconnected by a cylindrical member 51 which passes through an aperture 53 formed in platform member 45, providing a bearing surface for rotational movement of the platform member. Support member 47 is securely fixed to camera shoe 15.

Crank member 49 carries a connecting rod 55 which has one end pin-secured at the perimeter of crank member 49 and has its other end pin-secured to a lever arm 57 extending from holding member 43. Relative movement of crank member 49 with respect to platform member 45 affects relative rotation of holding member 43 via connecting rod 55, so that the line of sensing of photosenitive device 33 along optical path 41 is maintained substantially parallel with the camera lens axis. Thus, as flash device 11 is rotated, holding member 43 is correspondingly rotated, maintaining the line of sensing of light sensor 31 toward the scene being photographed.

A filter member 59 is positioned above holding member 43 and is selectively rotatable independently of the rotational position of holding member 43 for placing one of a plurality of apertures 61, 63, 65 into optical path 39. The rotational position of filter member 59 is established, for example, by the operator setting as associated mechanical calculator (not shown) for placement of a selected one of the apertures into optical path 39 for controlling the duration of the flash in view of the ASA speed number of the film the operator is employing and the F-stop setting the operator desires to use. Reference is made to U.S. Pat. No. 4,067,024 issued on Jan. 3, 1978, to the same inventor as that of the present invention, which discloses such a mechanical calculator employing aperture positioning.

The use of a rotatable mirror 35 to control the effective line of sensing of photosensing device 33 permits the photosensing device to remain fixed with respect to the flash device, and thus permits filter member 59 of an associated calculator to be utilized with a rotating sensor. As will suggest itself, photosensing device 33 may be secured to rotatable member 43 for direct sensing along optical path 41. The associated calculator would then operate on the flash circuitry by electronic aperturing in place of a mechanical filter member 59.

Referring to FIG. 3, a further degree of freedom for positioning of flash device 11 may be provided by a tilt support member 67 which permits rotation of rotational axis 17 within a plane parallel to the plane of the camera film. The tilt support member 67 is formed of a pair of mateable bases 69, 71 which are pivotably connected at one end via a pin 73, for relative pivoting of the bases along a tilt axis 75. Base 69 is secured to camera shoe 15 in a position for disposing tilt axis 75 substantially parallel to camera lens axis 19. Base 71 mates with base 69 in a position for supporting the flash device in its normal operating flash position, i.e., one in which rotational axis 17 is relatively vertical.

Platform member 45 is positioned at a distance above the tilt support member by a cylindrical member 77 which has one end secured to base 71 and another end which passes up through aperture 53, to control rotation of holding member 43. A cylindrical sleeve 79 depends from platform member 45 for providing a bearing surface for cylindrical member 77, permitting rotational movement of the flash device about axis 17.

A connecting pin 81 may be utilized to restrict the relative vertical movement of sleeve 79 with respect to cylindrical member 77. Pin 81 is positioned through an aperture 83 formed in sleeve 79 for riding in a circumferential groove 85 formed in the outer surface of cylindrical support 77. Also, a groove 87 may be formed in base 71 for permitting an electrical wire to pass up through camera shoe 15, loop around pin 73 and back up through cylindrical support 77 for providing electrical communication between the camera and the flash device, while permitting free pivoting of tilt support member 67.

In place of crank member 49 and connecting rod 55 of FIG. 2, a set of mating gears 89, 91 may be utilized for controlling the rotational position of holding member 43. The holding member is fashioned with gear teeth 93 around its outside peripheria for mating with gear 91 which serves as an idler gear between holding member 43 and gear 89. Gear 89 presents teeth at the same diameter as teeth 93 of the holding member and is connected to cylindrical support 77 for relative rotational movement with respect to the flash device. Similarly, a toothed rack or a connecting drive belt may be used to rotate holding member 43, as well as other means which will suggest themselves to persons skilled in the art.

It should be understood, of course, that the foregoing disclosure relates to preferred embodiments of the invention and that other modifications or alterations may be made therein without departing from the spirit or scope of the invention as set forth in the claims.

What is claimed:

1. An electronic flash device for permitting bounce flash photography, comprising:

flash tube means for producing a light flash output at a general flash direction;

light monitoring means responsive to light for generating an electrical signal for affecting termination of said flash output;

housing means for housing said flash tube and for housing said light monitoring means;

first means for mounting said light monitoring means to said housing means and for defining a general path of sensing of said light monitoring means relative to said housing means, said first means including optical means for providing said path of sensing with a first linear path and a second linear path, said first means permitting rotation of said second path about an axis of rotation colinear to said first path and maintaining said first and said second linear path in the same plane and at a fixed angular relationship during rotation, for permitting directional changing of said path of sensing relative to said housing means;

second means connected to said housing means for permitting attachment of the same to a camera;

means for positionally changing said flash direction of said flash tube means with respect to said second means; and positioning means responsive to the relative position of said flash direction with respect to said second means for rotating said second linear path for maintaining the same in a substantially fixed relationship with respect to said second means.

2. An electronic flash device for permitting bounce flash photography, comprising:

flash tube means for producing a light flash output;

light transducer means for monitoring light along a general line of sensing and generating an electrical signal for affecting termination of said flash output;

housing means for locating said flash tube at a position for projecting said flash output along at least one general flash direction relative to said housing means, said housing means mounting said light transducer means for permitting directional positioning of its said line of sensing relative to said housing means;

mounting means connected to said housing means for permitting attachment of the same to a camera, said mounting means for permitting rotation of said housing means about an axis vertical with respect to the camera when the camera is held in its normal operating position, for changing said general flash direction relative to the camera; and automatic positioning means responsive to rotation of said housing means with respect to the camera, for rotating said line of sensing of said light transducer means about an axis fixed with respect to said housing for maintaining said line of sensing substantially parallel with respect to the lens axis of the camera.

3. An electronic flash device according to claim 1 wherein said light monitoring means includes photosensing means for direct sensing of light along said first path; and wherein said optical means transfers light from said second path onto said first path; and wherein said positioning means includes means for rotating said optical means for directionally changing said path of sensing.

4. An electronic flash device according to claim 3 and further including filter means mounted between said photosensing means and said optical means for filtering light along said first path, said filter means operable for selectively varying the degree of light filtering.

5. An electronic flash device according to claim 1, wherein said second means includes a camera shoe securement device; and wherein said means for positionally changing said flash direction includes rotatable mounting means secured between said camera shoe securement device and said housing means for providing relative rotation of said housing means with respect to said securement device.

6. An electronic flash device according to claim 5 wherein said positioning means includes means for indicating the relative rotational position of said camera shoe securement device with respect to said housing means; and transducer means connected to said indicating means for transducing said relative rotational position to a force for directionally changing said path of sensing.

7. An electronic flash device according to claim 6 wherein said indicating means includes rotating means exhibiting rotational movement relative to said housing means; and wherein said transducing means includes means coupled to said rotating means for directionally changing said general path of sensing.

8. An electronic flash device according to claim 7 wherein said means coupled to said rotating means includes a gear drive member.

* * * * *